G. CLAUDE.
PROCESS OF SEPARATION OF THE CONSTITUENTS OF GASEOUS MIXTURES.
APPLICATION FILED MAR. 17, 1910.
1,083,988. Patented Jan. 13, 1914.
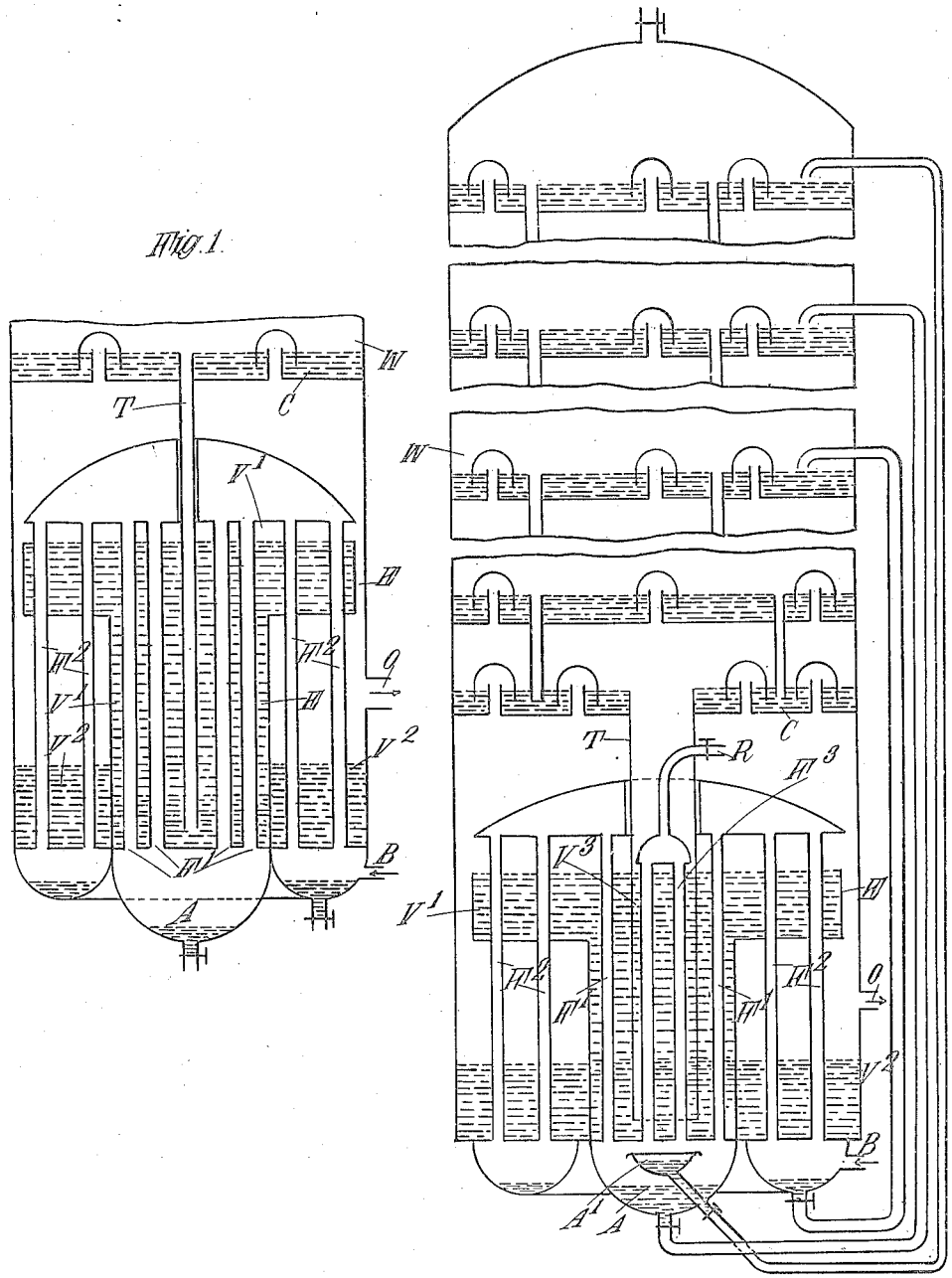

UNITED STATES PATENT OFFICE.

GEORGES CLAUDE, OF PARIS, FRANCE, ASSIGNOR TO SOCIÉTÉ L'AIR LIQUIDE (SOCIETE ANONYME POUR L'ETUDE ET L'EXPLOITATION DES PROCEDES GEORGES CLAUDE), OF PARIS, FRANCE.

PROCESS OF SEPARATION OF THE CONSTITUENTS OF GASEOUS MIXTURES.

1,083,988.     Specification of Letters Patent.     Patented Jan. 13, 1914.

Application filed March 17, 1910. Serial No. 550,005.

*To all whom it may concern:*

Be it known that I, GEORGES CLAUDE, a citizen of the Republic of France, residing at 48 Rue St. Lazare, Paris, in the Republic of France, have invented certain new and useful Improvements Relating to the Separation of the Constituents of Gaseous Mixtures, of which the following is a specification.

This invention relates to the separation of the constituents of gaseous mixtures, particularly of atmospheric air, by the known processes working on what is hereinafter referred to as the principle of backward return.

The chief object of the present invention is to improve the separation that takes place during the progressive condensation of the air treated by such processes, and eventually, as a consequence, to improve the rectification produced by the use of the liquids furnished by this progressive condensation.

The principle of backward return above referred to has already been disclosed, for example in the specification of the United States Patent No. 924,428; it consists, fundamentally, in passing air along a tube immersed in a very cold liquid and causing the portions of the air that are liquefied in the tube to flow backward in opposition to the further quantities of oncoming air, so that the oncoming air sweeps over the surface of the backwardly flowing liquefied portions, whereby the air becomes enriched in the more volatile constituent, nitrogen, and the liquefied portions in the less volatile constituent, oxygen. As appears from this patent, it is advisable, unless a relatively high pressure of liquefaction is adopted, for the upper part of the tube or tubes to be subjected to a temperature lower than that of the lower part, since this permits of the comparatively pure gaseous nitrogen being partially condensed in the upper part of the tube or tubes.

Consider now the apparatus disclosed in United States Patent No. 881,176, employed for liquefying the air in separate portions. This apparatus consists of two nests of tubes, one nest being upwardly conducting, and the other nest, in continuation of the first, downwardly conducting. Owing, however, to these nests of tubes being immersed in a practically homogeneous liquid, and, therefore, one of practically uniform temperature throughout, it follows from the remarks given above regarding the separation of the nitrogen in a pure state, that, unless an initial high pressure incompatible with a good yield be employed, the only other way of obtaining the high pressure necessary for the successful production of liquid rich in nitrogen in the second or downwardly conducting nest of tubes is to make the tubular surface of this nest small compared with that of the upwardly conducting nest of tubes, in which liquid rich in oxygen is produced. Owing to there then being only a small quantity of liquefied nitrogen obtained in comparison with the quantity of liquid rich in oxygen, the exactitude of the rectification effected in a suitable rectifying column in the well known manner, by introducing the liquid nitrogen and liquid rich in oxygen into the column, is detrimentally affected, because the liquid nitrogen instead of retaining, as it should, the whole of the oxygen in the gases ascending the column, allows a little gaseous oxygen to escape with the nitrogen, at the rate of two or three per cent. approximately.

According to the present invention the above mentioned defects are obviated by improving the partial separation that occurs during the liquefaction in separate portions. The liquids obtained as a result of this improved process are such as to enable a high degree of rectification to be effected by means of them.

In order that the invention may be clearly understood and readily carried into effect, the same will now be described more fully with reference to the accompanying drawings in which:—

Figure 1 represents the lower part of apparatus adapted for the production of liquid rich in oxygen and liquid rich in nitrogen separately as hereinafter described. Fig. 2 represents a complete apparatus with a modified lower part.

Referring first to Fig. 1 it is seen that the air to be treated enters through the pipe B a peripheral nest of tubes $F^2$ and in ascending this nest undergoes the partial liquefaction with backward return that deprives it of its oxygen. The liquefaction of the gaseous residue escaping from the tubes F² therefore takes place in the downward direction in the central nest of tubes F′, which, instead of being immersed in the same liquid as the nest of tubes F², is immersed in a different liquid. The central nest of tubes F′ is incased by a casing E which likewise incases the upper part of the tubes F². The liquid already rich in oxygen, which flows from the last plate C of any well known type of rectification column W surmounting the arrangement of tubes F′ F² in which liquefaction in separate portions takes place, as shown, is conducted through the tube T in a permanent or positive manner to the lower part of the vaporizer V′ formed by the casing E. It is only the overflow from this vaporizer V′ which enters the vaporizer V² which covers the lower part of the nest of tubes F². The lower part of the tubes F² is thus covered by liquid that has already experienced a first evaporation owing to its contact with the tubes F′ and with the upper part of the tubes F². The second evaporation, which takes place in the vaporizer V², furnishes pure oxygen, which is collected laterally through the pipe O. The gases rich in oxygen not drawn off through the pipe O and also those resulting from the first evaporation of the liquid in the vaporizer V′ ascend the rectification column where they purify the descending liquids. As a result of this arrangement there exists between the two liquids in the vaporizers V′ and V² a considerable difference of temperature which insures the liquefaction of pure nitrogen at the upper part of the tubes F². The rectification in this nest of tubes F² is thus able to take place under excellent conditions for backward return especially if the lower part of the tubes is covered by a small quantity of liquid only; the result is an abundant production of pure liquid nitrogen in the tubes F′, which production is facilitated by the fact of the lower temperature of the liquid in the vaporizer V′. Practically this device is sufficiently efficacious to insure that the liquid nitrogen collected in the chamber A at the bottom of the tubes F′ in the ratio of one part for three parts of air treated does not contain more than from one and one half to two per cent. (1.5 to 2%) of oxygen, and this liquid nitrogen if introduced at the top of the rectifying column in the well known manner is theoretically capable of rectifying the gas rich in nitrogen escaping from the top of the column so much that the gas contains only one half per cent. (0.5%) of oxygen. Although this result is practically very important it may happen that it is not sufficient. This is the case where nitrogen which is practically chemically pure is required, as for example in the manufacture of cyanamid.

The present process is then completed by subjecting to a further liquefaction under favorable conditions the gaseous residue already very poor in oxygen which comes from the liquid in the chamber A. The means for effecting this are shown in Fig. 2. In addition to the two nests of tubes F′ and F² a third nest of tubes F³ is arranged in the interior of the tube T down which the liquid that flows from the last plate of the rectification column W passes. The space surrounding the tubes F³ thus constitutes a third vaporizer V³ which is supplied with colder liquid than that supplied to the vaporizer V′, and, a fortiori, than that supplied to the vaporizer V². Although the gaseous residue with which the tubes F³ is supplied is constituted by the least condensable parts of all the air treated, it can readily condense. Two distinct methods of operating can therefore be adopted; either this residue can be liquefied totally in F³, collected in a special collector A′, and introduced at an appropriate point in the superposed rectification column W (Fig. 2) thus increasing the proportion of gaseous nitrogen escaping therefrom, or the liquefaction with backward return in the tubes F³ can be only partial, the resultant liquid being allowed to mix with that coming from the tubes F² (the collector A′ being dispensed with) and the gaseous residue which escapes from the upper part of the nest of tubes F³ and which is constituted by almost chemically pure nitrogen being merely collected by suitably opening the cock R (Fig. 2).

What I claim and desire to secure by Letters Patent of the United States is:

1. A method of separating by means of liquefaction compressed and cooled air into liquids rich in oxygen and nitrogen, respectively, consisting in passing it through an upwardly conducting laterally confined space, and then in continuation through a downwardly conducting confined space, and maintaining the downwardly conducting space, and the upper part of the upwardly conducting space at a lower temperature than the lower part of the upwardly conducting space and sufficiently low to cause the liquefaction in those parts of the nitrogen of the gaseous mixture.

2. A method of separating by means of liquefaction compressed and cooled air into liquids rich in oxygen and nitrogen, respectively, consisting in passing it through an upwardly conducting laterally confined space and then in continuation through a downwardly conducting confined space, surrounding the upper part of the upwardly conducting space and the whole of the downwardly conducting space with liquid rich in oxygen, and surrounding the lower part of the upwardly conducting space with the overflow liquid from that surrounding the upper part of this space.

3. A method of separating by means of liquefaction compressed and cooled air into liquids rich in oxygen and nitrogen, respectively, consisting in passing it through an upwardly conducting laterally confined space, then in continuation through a downwardly conducting confined space and lastly through a second upwardly conducting confined space, and maintaining the three spaces at three different temperatures, the temperature of the second upwardly conducting space being sufficiently low to cause the total or partial liquefaction of the nitrogen of the gaseous mixture rich in nitrogen ascending it.

4. A method of separating by means of liquefaction compressed and cooled air into liquids rich in oxygen and nitrogen, respectively, consisting in passing it through an upwardly conducting laterally confined space, then in continuation through a downwardly conducting confined space and lastly through a second upwardly conducting confined space, and circulating a liquid rich in oxygen first in contact with the second upwardly conducting space, then with the downwardly conducting space and the upper part of the first upwardly conducting space and finally the lower part of the upwardly conducting space.

5. The combination with the process hereinbefore described for producing the liquefaction of compressed and cooled air into three separate portions, the first being rich in oxygen, the second rich in nitrogen, and eventually the third richer in nitrogen, of a process of rectification, in which the aforesaid three liquid portions are utilized to rectify an ascending column of vapor, and are delivered into contact with the column of vapor at three appropriate heights, the liquid richest in nitrogen being delivered at the highest point.

6. In combination with the process hereinbefore described for producing the liquefaction of compressed and cooled air into three separate portions, the first being rich in oxygen, the second rich in nitrogen, and the third richer in nitrogen; drawing off in its gaseous state part of the gas richest in nitrogen and undergoing the third stage of the liquefaction, and utilizing the remaining portion, after its liquefaction, in conjunction with the other liquid portions, in a process of rectification.

7. In a process for producing the liquefaction of compressed and cooled air in three separate portions, the first being rich in oxygen, the second rich in nitrogen, and eventually the third richer in nitrogen, the improvement which consists in delivering the liquids on to the column at three appropriate heights to rectify an ascending column of oxygen and nitrogen vapors, the liquid richest in nitrogen being delivered at the highest point, collecting the liquid resulting from the rectification and circulating the collected liquid in indirect contact with further quantities of the above-mentioned compressed and cooled air.

In testimony whereof I affix my signature in presence of two witnesses.

GEORGES CLAUDE.

Witnesses:
 PIERRE HOURLIER,
 H. C. COXE.